Aug. 27, 1935.  G. W. HOPKINS, JR., ET AL  2,012,510
TRACTOR
Filed Dec. 9, 1932  8 Sheets-Sheet 8
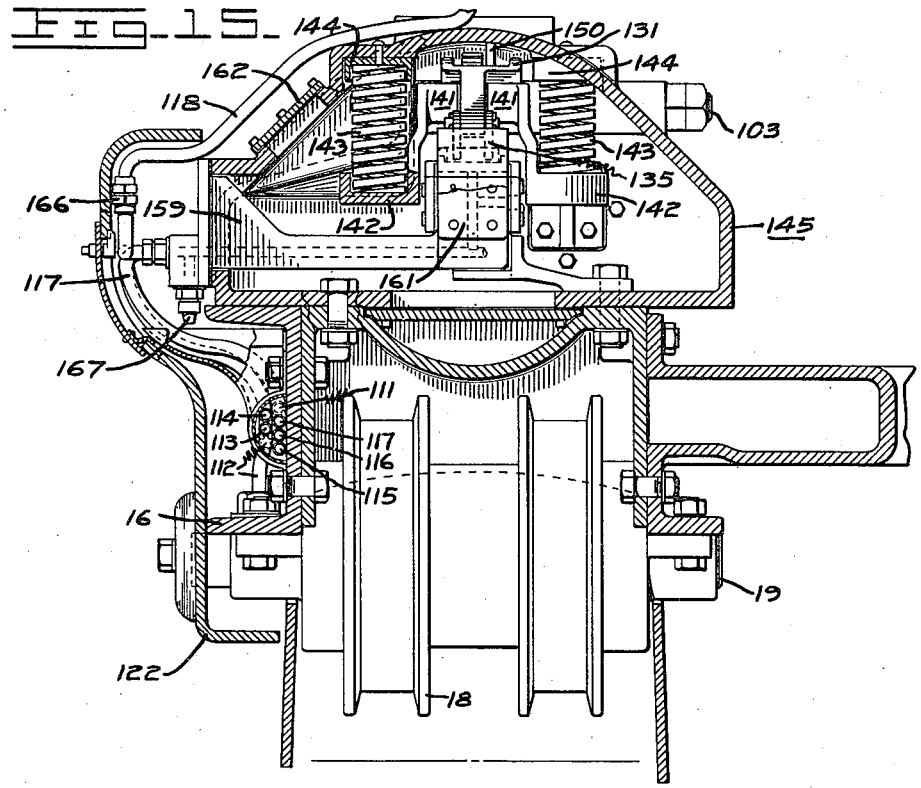
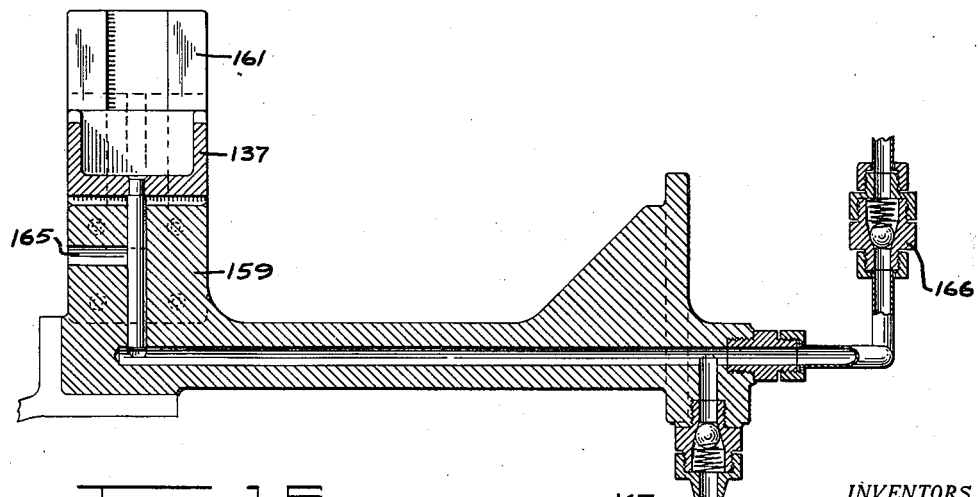
INVENTORS.
George W. Hopkins Jr.
Elmer E. Wickersham
BY
ATTORNEY.

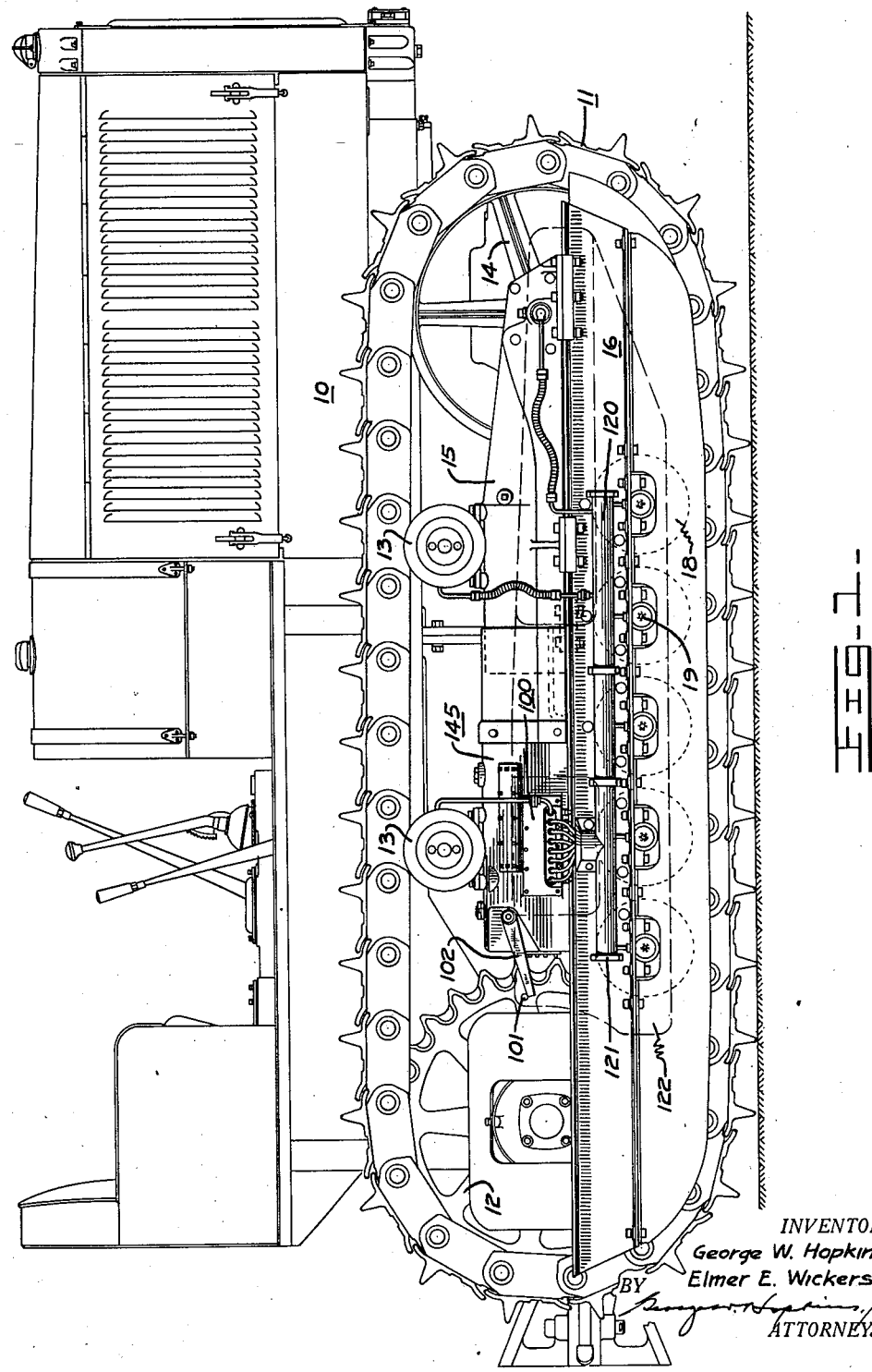

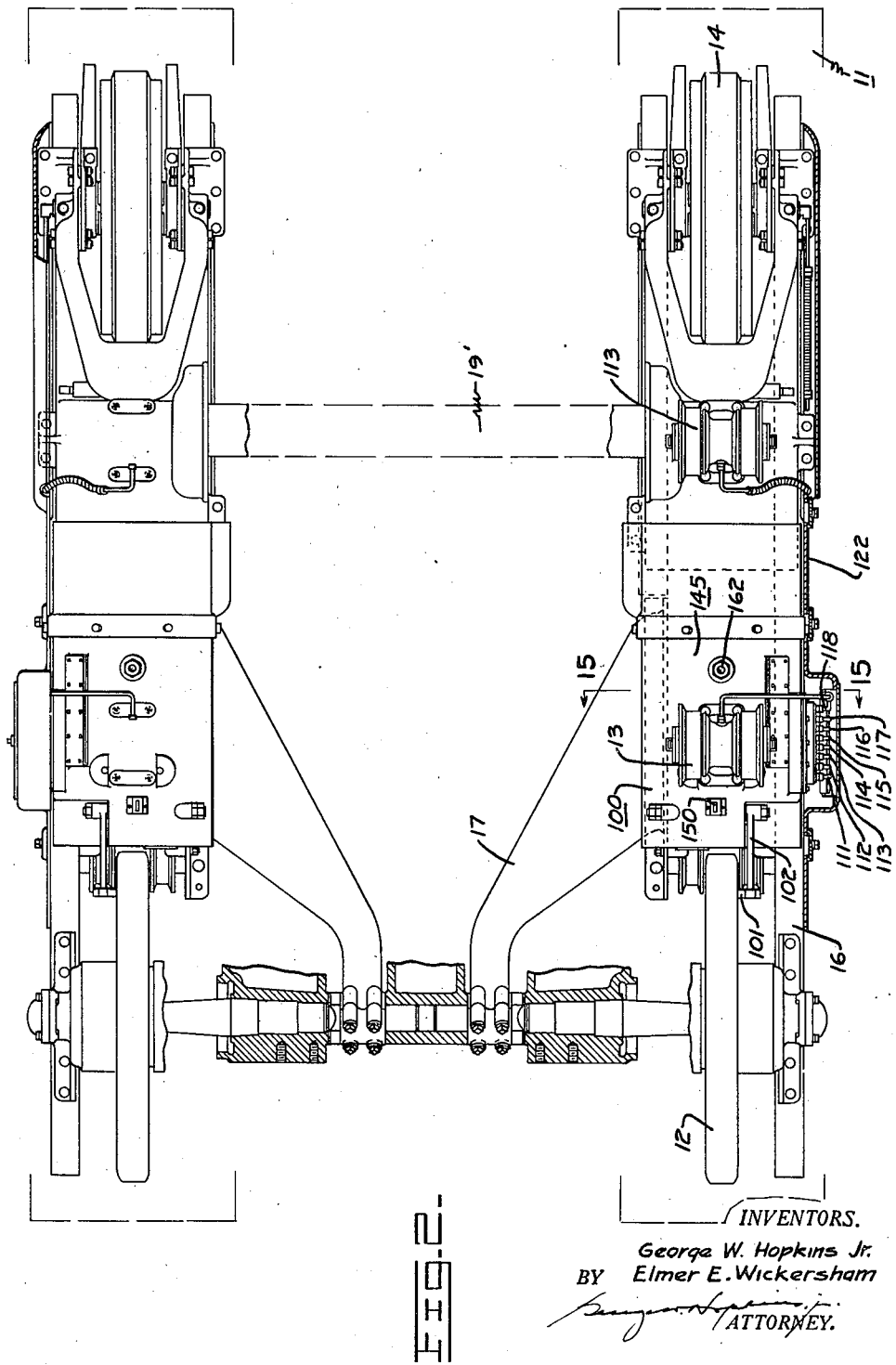

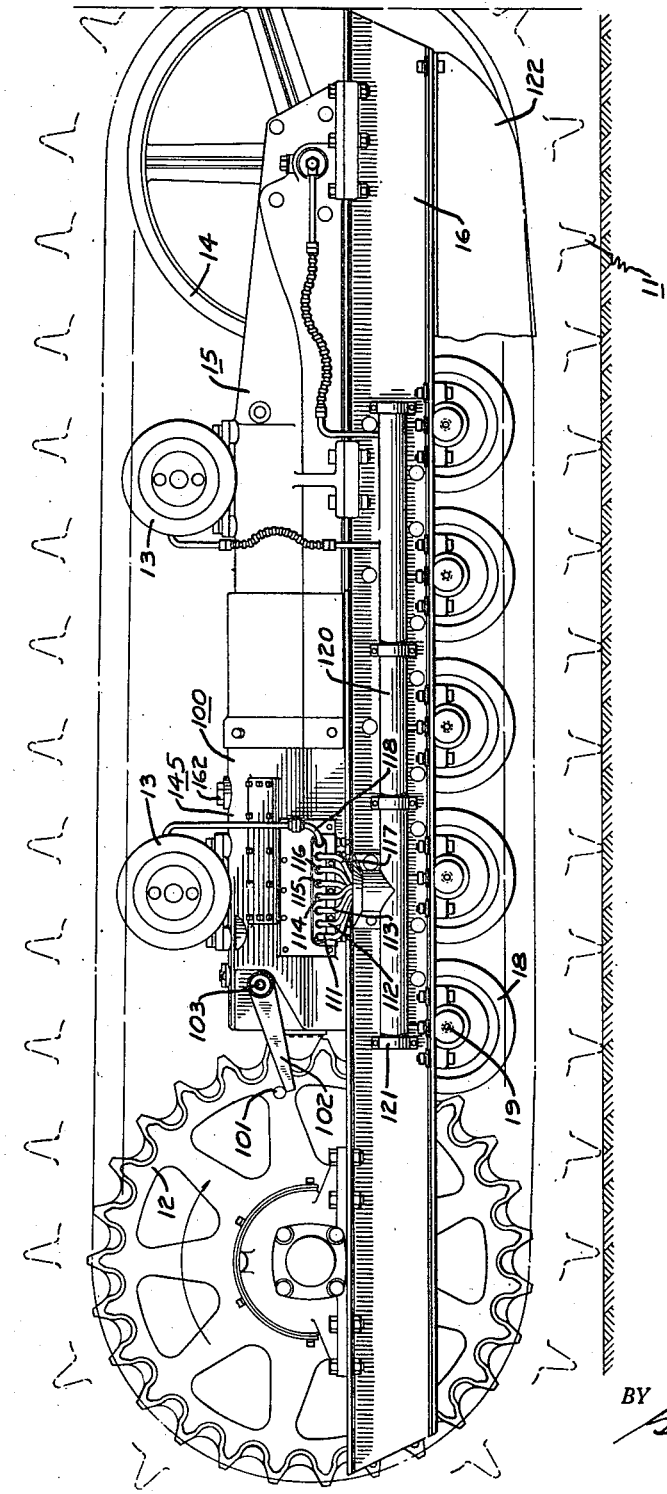

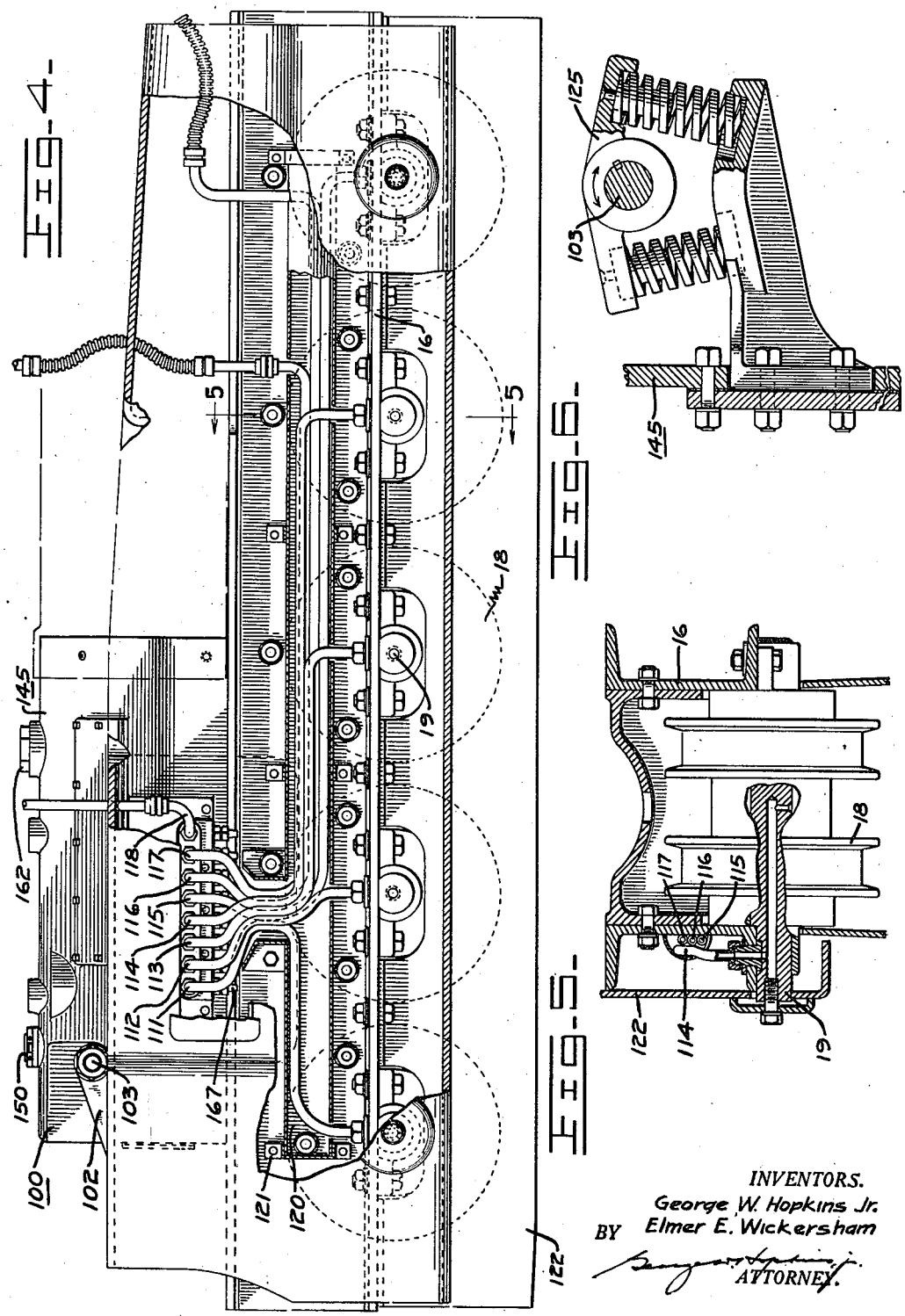

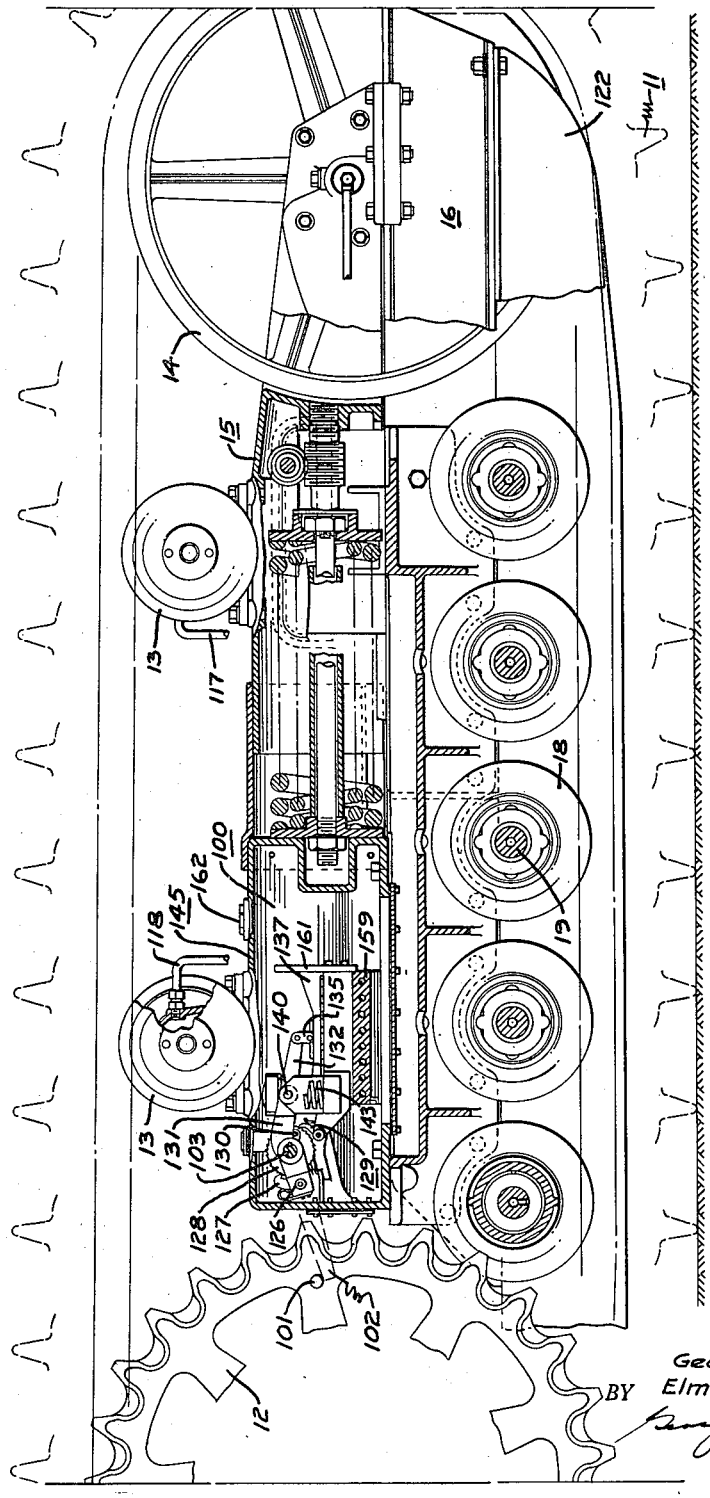
FIG-7-

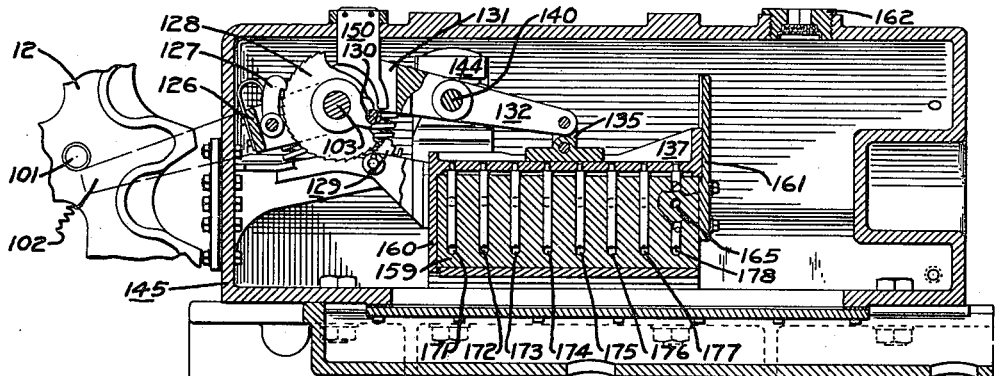
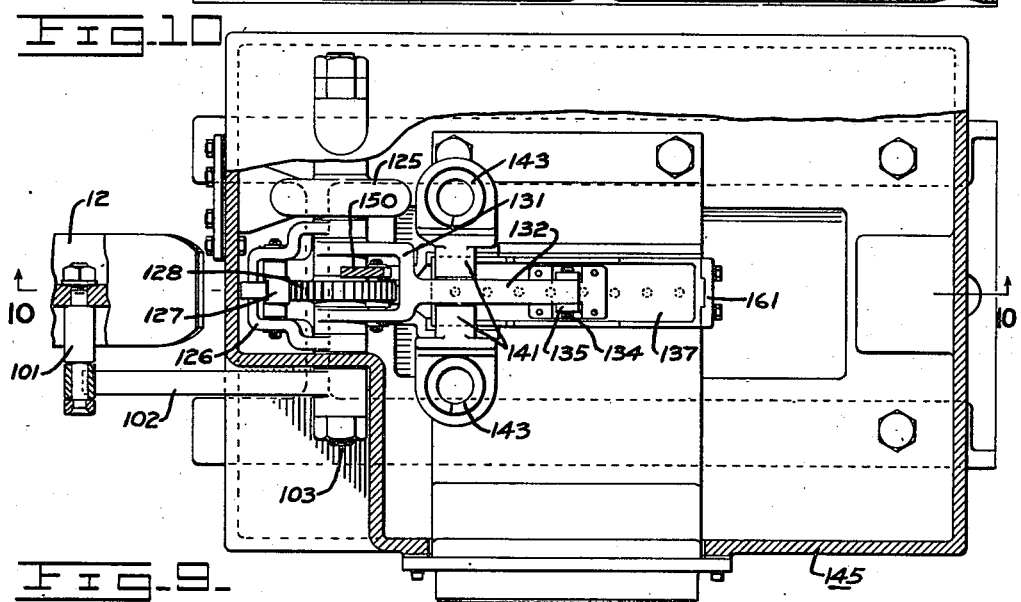
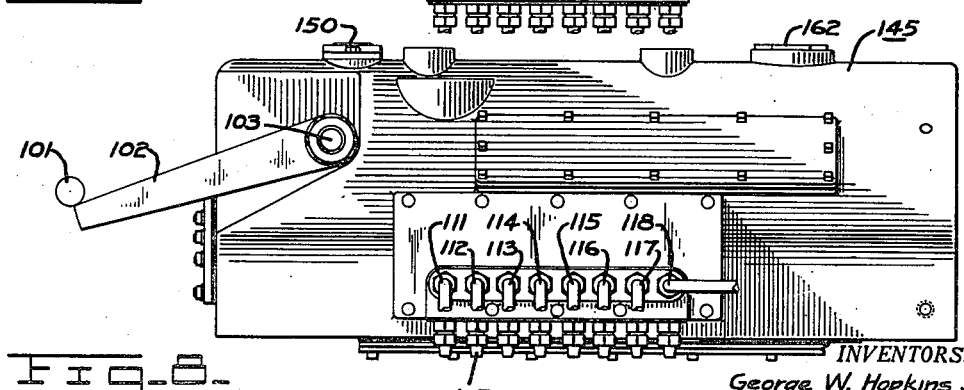

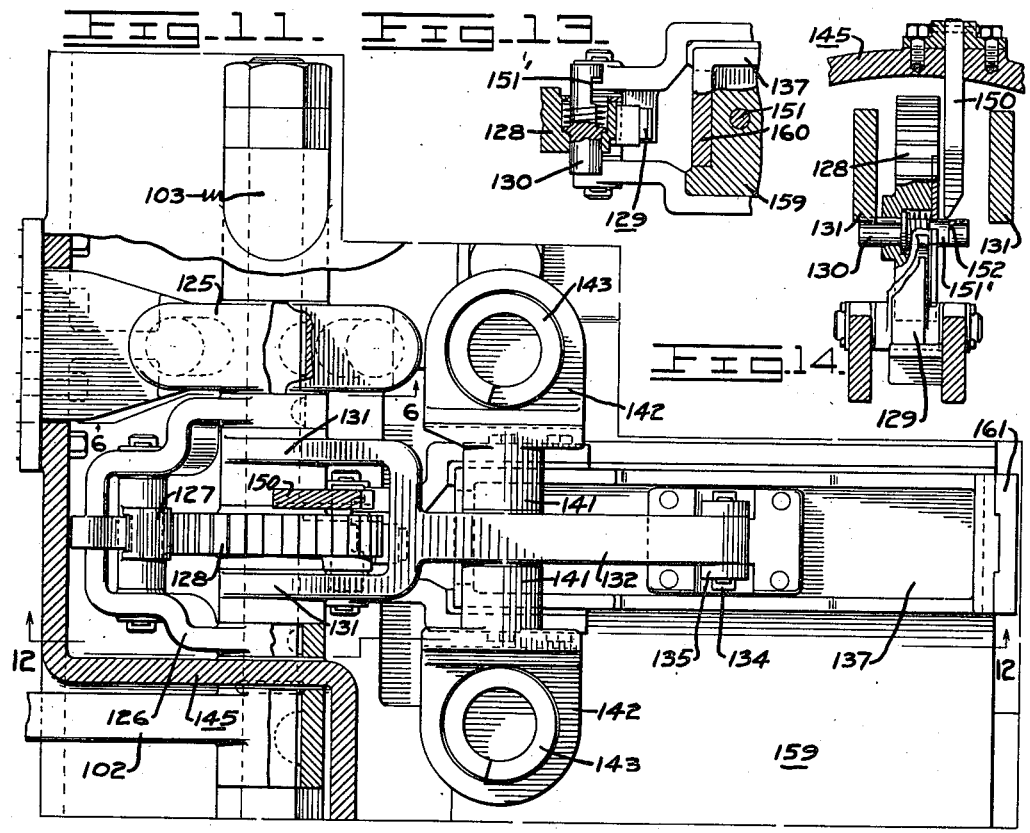
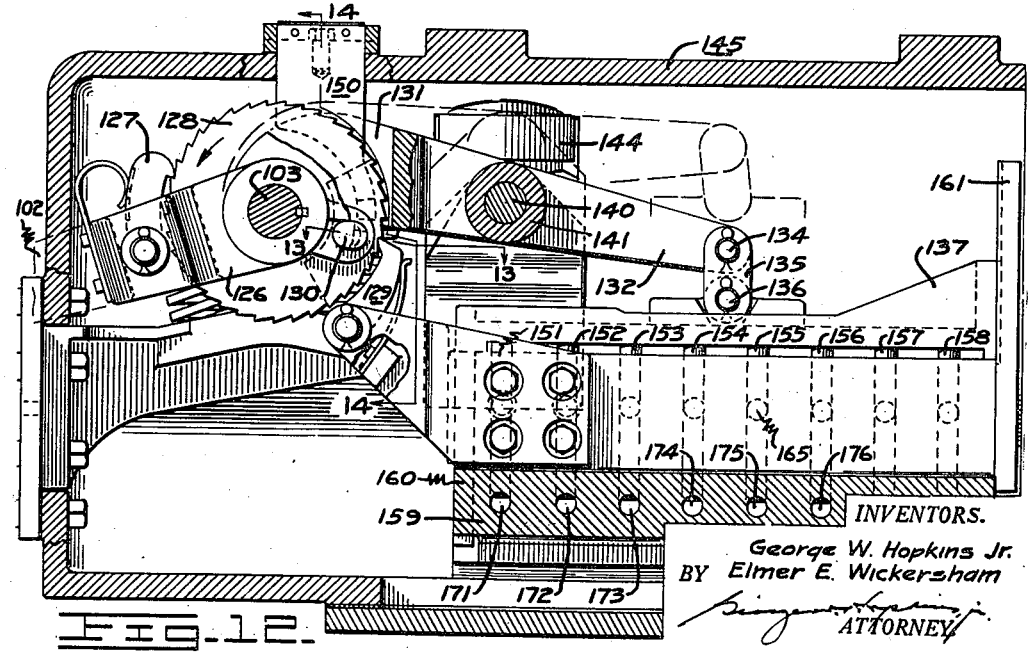

Patented Aug. 27, 1935

2,012,510

UNITED STATES PATENT OFFICE 2,012,510

TRACTOR

George W. Hopkins, Jr., and Elmer E. Wickersham, San Leandro, Calif., assignors to Caterpillar Tractor Co., San Leandro, Calif., a corporation of California Application December 9, 1932, Serial No. 646,462

8 Claims. (Cl. 184—7)

The tractor roller frame assemblies of track-type tractors contain several bearings which it is important to lubricate. It is particularly important that the bearings of the track rollers which carry the weight of the machine be supplied with adequate lubrication at all times. Manual lubrication of these parts is unsatisfactory and unreliable and impractical because frequency of lubrication is an important factor. The problem of providing an automatic system of lubrication for these parts is complicated by the fact that they are movable relatively to the main frame or power plant of the tractor.

It is an object of this invention to provide an improved system for lubricating the bearing parts of the track roller frame assembly of a track-type tractor which will be entirely mechanical in its operation.

Another object of the invention is to provide an improved system for lubricating the bearing parts of the track roller frame assembly of a track-type tractor which consists of a unitary device mounted on the track roller frame which does not require any connection to the power plant of the tractor other than a simple mechanical connection to the track driving sprocket wheel.

Other objects of the invention will appear as the description progresses.

Fig. 1 is a side elevation of a tractor in which the invention has been embodied.

Fig. 2 is a plan view illustrating the application of the lubricating system to the track roller frame assemblies of the tractor.

Fig. 3 is a side elevation of the same.

Fig. 4 is an enlarged view of the principal portion of Fig. 3 with parts broken away.

Fig. 5 is a detailed view of the track roller construction.

Fig. 6 is a detailed view of the centralizing springs for the operating lever. The view is taken on the line 6—6 in Fig. 11.

Fig. 7 is a cutaway view of the track roller frame to show the method of mounting the mechanism of the lubricating system.

Fig. 8 is a view illustrating the operating device and the pipe connections.

Fig. 9 is a plan view of the pump operating mechanism, certain parts being broken away.

Fig. 10 is a sectional view on the line 10—10 in Fig. 9.

Fig. 11 is an enlarged view of a portion of the mechanism shown in Fig. 9.

Fig. 12 is a section taken on the line 12—12 in Fig. 11.

Fig. 13 is a section taken on the line 13—13 in Fig. 12.

Fig. 14 is a section taken on the line 14—14 in Fig. 12.

Fig. 15 is a section through the track roller frame assembly taken on the line 15—15 in Fig. 2.

Fig. 16 is a fragmentary view showing the arrangement of the pump inlet port and discharge line.

General arrangement (Figs. 1 to 7)

The invention is disclosed as embodied in a track-type tractor whrich comprises briefly a power plant mounted on a pair of track mechanisms which are movable relatively to the power plant. Such a tractor is shown in Fig. 1 where the power plant of the tractor is indicated generally by reference numeral 10. The track mechanism on the right side of the machine is shown, and it comprises an endless track 11 which passes around a track drive sprocket 12 at the rear end of the machine and over a pair of guide rollers 13 and around an idler wheel 14, the axis of which is adjustable with respect to the axis of the sprocket wheel 12 to maintain the proper tension in the endless track 11. The idler wheel 14 and its bearings form part of an assembly indicated generally at 15, which assembly is guided for movement on the track roller frame 16 so that the idler wheel can be maintained in the proper position to secure the desired tension in the endless track 11, and also to permit the idler wheel 14 to recoil against suitable springs in case the track becomes clogged. This mechanism forms no part of the present invention and will not be described further. The track roller frame 16 is provided with a series of track rollers 18 which are provided with suitable bearings on stub shafts 19 secured in the track roller frame 16.

The track mechanisms are similar, and, as shown in Fig. 2, the track roller frames 16 are provided with braces 17; the track roller frames are pivoted about a common axis which axis is coincident with the axis of the track driving sprockets 12. It will be understood that the track roller frames 16 are free to oscillate about their pivots and in so doing move relatively to the power plant 10. The front ends of the track roller frames 16 are interconnected by a suitable equalizer mechanism indicated at 19' in Fig. 2, which supports the front end of the power plant 10 in the usual manner.

The lubricating mechanism for the track roller frame assemblies consists of two similar units, one mounted on each track roller frame. One of these units will now be described. Its location on the track roller frame 16 is shown in Fig. 1 where it is indicated generally by the reference numeral 100. It will be understood that this unit is designed to be an attachment for a standard track-type tractor, and as will appear from the description, it can be readily applied thereto and removed therefrom. It will be noted that the lubricating unit 100 is conveniently located in a housing directly behind the assembly 15 (Fig 1). The source of power for operating the unit is the track driving sprocket 12 adjacent thereto (Fig. 3) which is provided with pin 101. Lever 102 pivoted at 103 has its free end lying in the path of pin 101 so that for each revolution of track driving sprocket 12, pin 101 oscillates lever 102. This movement of lever 102 is utilized in a manner later described for operating a pump or pumps which discharge lubricant into a series of conduits 111, 112, 113, 114, 115, 116, 117, and 118. Conduit 111 leads to the bearing of the rearmost track roller 18 (Fig. 4). Conduit 112 leads to the next track roller bearing. Conduit 113 leads to the center track roller bearing, and conduits 114 and 115 lead to the two forward track roller bearings. Conduit 116 leads to the idler wheel bearings. Conduit 117 and 118 lead to the bearings of the guide rollers.

The conduits 111 to 117 are provided with a protective housing 120 secured to the web of the side channel of the track roller frame 16 by means of brackets 121. In addition, a shield 122 shown in dotted line in Fig. 1 and in section in Fig. 2 is adapted to be attached to the side of the track roller frame assembly to further protect the conduits. The method of attaching this shield is disclosed in Fig. 5 which also illustrates the conduits within their housing 120.

*Pump operating mechanism (Figs. 8 to 16)*

Lever 102 is keyed to the outer end of pivot shaft 103 (Fig. 11). Keyed to the inner end of shaft 103 is a yoke 125 which operates against a pair of springs shown in detail in Fig. 6 to resiliently maintain lever 102 in a position in which the lever is radial to the sprocket wheel. It follows that the shaft 103 performs an oscillation during each revolution of the track driving sprocket 12 in either direction. Keyed to the central portion of shaft 103 (Figs. 11 and 12) is a bail 126 on which is mounted a spring-pressed pawl 127 which engages the teeth of a ratchet wheel 128 loosely mounted for rotation on shaft 103. Cooperating with ratchet pawl 127 is a detent 129 suitably mounted in the frame to prevent return movement of ratchet wheel 128. The ratchet wheel has a step-by-step movement in a counter-clockwise direction (Fig. 12).

Slidably mounted in ratchet wheel 128 is a pin 130 which is spring-pressed to the left (Fig 14) to engage one arm of a fork 131 pivotally mounted on shaft 103 as shown in Fig. 11. The stem of the fork has a pivotal connection at 134 with a short link 135, having pivotal connection 136 with cross-head 137. Secured to an intermediate portion of fork stem 132 is a pin 140 upon the outer ends of which are pivotally mounted the hubs 141 of a pair of stirrups 142 (Fig. 15) which engage compression springs 143, the upper ends of which engage in cups 144 secured to housing 145.

Secured to the top of housing 145 is a cam plate 150 (Figs. 12, 13 and 14), the lower end of which is beveled and adapted to engage in a notch 151' in pin 130. Notch 151' has a beveled corner 152 to facilitate entrance of the beveled tip of plate 150 into notch 151' to cause retraction of pin 130 against its spring. It will appear from inspection of Fig. 12 that at a certain point in the revolution of ratchet wheel 128, the notched end of pin 130 will be brought into engagement with the tip of cam plate 150. This occurs when the fork stem 132 is in the dotted line position which is the position in which the springs 143 are fully compressed.

Withdrawal of pin 130 (Fig. 14) from below fork arm 131 releases the fork which is now free to rotate about shaft 103 under the influence of compressed springs 143 which operate to quickly depress cross-head 137. This movement of cross-head 137 is utilized to actuate the pumps. It will be understood that the ratchet wheel 128 continues to move step by step in a counter-clockwise direction (Fig. 12) and that after the pin 130 has been carried out of the vicinity of cam plate 150, it returns to its normal projected position under the influence of its spring in which position it is operative to contact the under side of fork 131 when next it engages it. This cycle of operation is repeated again and again and for each cycle of operation there is a sudden actuating force imparted to cross-head 137.

*Pump mechanism (Figs. 10 to 16)*

Cross-head 137 has rigidly attached thereto a series of plungers 151, 152, 153, 154, 155, 156, 157, and 158 (Fig. 12). Each plunger is adapted to reciprocate in a vertical bore provided therefor in block 153. Alignment of the plungers in the bores is assured by guiding the cross-head 137 relatively to block 159 by means of an extension 160 on cross-head 137 which is suitably guided on the rear face of block 159 and by means of an extension 161 on the forward end of block 159 in which the end of cross-head 137 is guided.

Housing 145 serves not only to protect the pump mechanism and the operating mechanism therefor but also as a reservoir for the lubricant which is introduced through the cap 162 (Fig. 10). Block 159 is provided with a series of inlet ports 165 (Fig. 16) each of which establishes communication between the plunger bore and the exterior of block 159, or, in other words, to the reservoir of lubricant. A series of transverse passages are provided in the block 159, one for each bore, which constitute delivery passages 171, 172, 173, 174, 175, 176, 177, and 178. One of these passages is shown in detail in Fig. 16 where it will be seen that it terminates in a check valve 166 and is provided with a relief valve 167. It will be understood that each plunger and bore has associated with it an inlet port, a delivery passage, a relief valve and a check valve substantially as shown in Fig. 16. The conduits leading from the check valves 166 connect with the conduits 111, 112, 113, 114, 115, 116, 117, and 118 (Fig. 8) so that each bearing is provided with a separate conduit and pump. By reference to Fig. 16, it will be seen that as cross-head 137 is reciprocated, lubricant will be drawn in through port 165 and discharged through check valve 166. If for any reason lubricant cannot be pumped past check valve 166, the relief valve 167 opens to protect the system and to give a visual indication of trouble.

In operation, the ratchet wheel 128 receives its step-by-step rotation from the sprocket-operated lever 102 and once during each revolution raises the fork 131 to withdraw the pump plungers from their bores and to load the springs 143, which, ir turn, cause the discharge of the pumps when the fork 131 is automatically released. The frequency of operation of the pumps is proportional to the rate of rotation of the sprocket and, hence, to the speed of the vehicle.

We, therefore, claim as our invention:

1. The combination with a tractor having a track mechanism, including an endless track, rollers running on the ground run of said track, and a sprocket for said track, of a device for lubricating said rollers, comprising a plurality of individual pumps, having plungers reciprocable in synchronism, operating means therefor comprising, a pin on said sprocket, a lever oscillated thereby, a pawl movable with said lever, a ratchet wheel engaged by said pawl, a detent for said ratchet wheel, and means to enable said ratchet wheel during a portion of its revolution to move said plungers, and conduit means extending from said pumps to the bearings of said rollers.

2. The combination with a tractor having a track mechanism, including an endless track, rollers running on the ground run of said track, and a sprocket for said track, of a device for lubricating said rollers, comprising a plurality of individual pumps, having plungers reciprocable in synchronism, operating means therefor comprising, a pin on said sprocket, a lever oscillated thereby, a pawl movable with said lever, a ratchet wheel engaged by said pawl, a detent for said ratchet wheel, and means to enable said ratchet wheel during a portion of its revolution to move said plungers, including an element on said ratchet wheel, and a member operatively connected with said plungers, and conduit means extending from said pumps to the bearings of said rollers.

3. The combination with a tractor having a track mechanism, including an endless track, rollers running on the ground run of said track, and a sprocket for said track, of a device for lubricating said rollers, comprising a plurality of individual pumps, having plungers reciprocable in synchronism, operating means therefor comprising, a pin on said sprocket, a lever oscillated thereby, a pawl movable with said lever, a ratchet wheel engaged by said pawl, a detent for said ratchet wheel, and means to enable said ratchet wheel during a portion of its revolution to move said plungers, including an element mounted on said ratchet wheel and resiliently urged to operative position, a member cooperating with said element, means operatively connecting said member with said plungers, and a device for rendering said element inoperable, and conduit means extending from said pumps to the bearings of said rollers.

4. The combination with a tractor having a track mechanism, including an endless track, rollers running on the ground run of said track, and a sprocket for said track, of a device for lubricating said rollers, comprising a plurality of individual pumps, having plungers reciprocable in synchronism, operating means therefor comprising, a pin on said sprocket, a lever oscillated thereby, a pawl movable with said lever, a ratchet wheel engaged by said pawl, a detent for said ratchet wheel, and means to enable said ratchet wheel during a portion of its revolution to move said plungers, including a lever connected with said plungers, an element on said ratchet wheel adapted to contact said lever and to move said lever, and spring means operating to oppose movement of said lever by said element, and conduit means extending from said pumps to the bearings of said rollers.

5. The combination with a tractor having a track mechanism, including an endless track, rollers running on the ground run of said track, and a sprocket for said track, of a device for lubricating said rollers, comprising a plurality of individual pumps, having plungers reciprocable in synchronism, operating means therefor, comprising, a pin on said sprocket, a lever oscillated thereby, a pawl movable with said lever, a ratchet wheel engaged by said pawl, a detent for said ratchet wheel, and means to enable said ratchet wheel during a portion of its revolution to move said plungers, including a pin slidably mounted on said ratchet wheel, a lever connected with said plungers, a spring urging said pin into the path of said lever, a spring opposing movement of said lever by said pin, and a cam device for withdrawing said pin from contact with said lever, and conduit means extending from said pumps to the bearings of said rollers.

6. The combination with a tractor having a main frame and a track mechanism, including an endless track, rollers running on the ground run of said track, a sprocket for said track, and a track roller frame on which the rollers are mounted, said track roller frame being mounted for movement with respect to said main frame, of a lubricating system for said rollers, all parts of said system being mounted on said track roller frame, and including pumping means, and means for actuating said pumping means from a moving part of said track mechanism.

7. The combination with a tractor having a main frame and a track mechanism, including an endless track, rollers running on the ground run of said track, a sprocket for said track, and a track roller frame on which the rollers are mounted, said track roller frame being mounted for movement with respect to said main frame, of a lubricating system for said rollers, said system comprising a lubricant reservoir on said track frame, pumping means mounted in said reservoir, conduit connections between said pumping means and said track rollers, and means for actuating said pumping means from a moving part of said track mechanism.

8. The combination with a tractor having a pair of track roller frames, each hinged for oscillatory movement in a vertical plane, track mechanism for each frame, including a sprocket wheel, an endless track about the frame, and rollers adapted to run on said track and mounted on said frame, of a separate lubricating system for the rollers on each fi me, comprising lubricant pumping means on each frame, conduit connections from said pumping means to said rollers, and means for operating each pumping means from a moving part of the track mechanism for a frame.

GEORGE W. HOPKINS, Jr.
ELMER E. WICKERSHAM.